Dec. 21, 1943.   C. E. BUOTE   2,337,308
PULLEY OR FEED WHEEL
Filed July 9, 1941
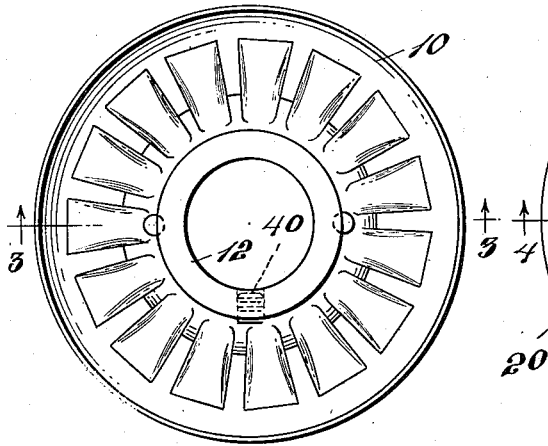
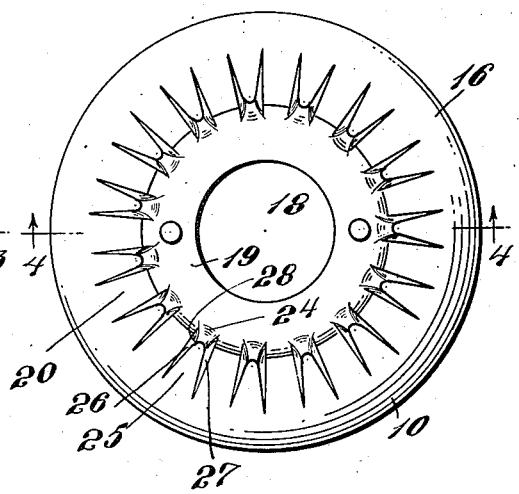
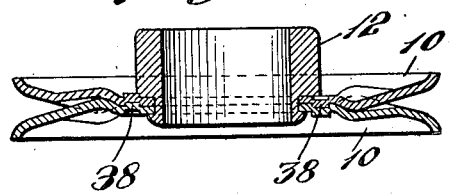
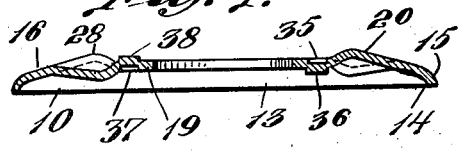
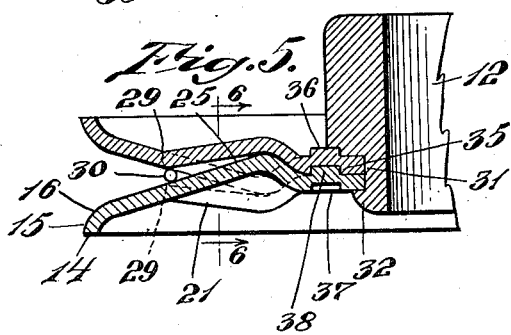
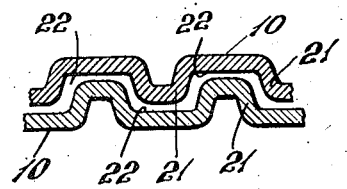
INVENTOR
Clarence E. Buote
BY Barlow & Barlow
ATTORNEYS Patented Dec. 21, 1943

2,337,308

UNITED STATES PATENT OFFICE 2,337,308

PULLEY OR FEED WHEEL

Clarence E. Buote, Pawtucket, R. I., assignor to H & B American Machine Company, a corporation of Maine Application July 9, 1941, Serial No. 401,626

2 Claims. (Cl. 74—230.8)

This invention relates to pulleys, and more particularly to feed wheels, tension wheels and pulleys of the type provided with a peripheral groove for receiving strand material such as, for example, a cord or the like; and has for one of its objects the provision of an improved pulley or wheel structure in which the working portions of the side walls of the groove are so arranged as to provide a sinuous path for the cord or strand and have good gripping engagement therewith without jamming and with no cut-out openings in the regions where the cord will be normally gripped.

Another object of the invention is to provide a pulley or wheel of this type which is of simple and inexpensive construction comprising a pair of duplicate opposed annular disc-like sections the side walls of which in the region of the working portions of the groove will be of an imperforate and radially corrugated character which will be arranged to provide interfitting means for gripping a cord or strand.

A further object of the invention is to provide means for centering and properly positioning the interfitting cord-gripping means of the two opposed sections, and for preventing rotative movement of the sections relative to each other.

With these and other objects in view, the invention consists of certain novel features of construction, as will be more fully described, and particularly pointed out in the appended claims.

In the accompanying drawing:

Fig. 1 is a side elevational view of a complete pulley or feed wheel embodying the preferred form of the invention;

Fig. 2 is a side elevation of one of the annular members of the pulley or wheel shown in Fig. 1;

Fig. 3 is a central sectional view taken on the line 3—3 in Fig. 1;

Fig. 4 is a central sectional view taken on line 4—4 in Fig. 2;

Fig. 5 is an enlarged fragmentary sectional view showing the interfitting relation of the cord-gripping elements of the pulley or wheel shown in Fig. 3; and Fig. 6 is a partial sectional view taken on line 6—6 in Fig. 5.

My improved pulley or wheel structure briefly comprises a pair of duplicate annular members fixedly mounted in opposed relation upon a hub in which each of the members has an intermediate corrugated body portion which is imperforate and formed with a plurality of radial ribs projecting outwardly from the inner face of the member and a plurality of radially arranged pockets extending laterally of the member in the opposite direction from the ribs in which the pockets alternate with the ribs in the same member to form spacing portions between the ribs and to provide in the assembled pulley or wheel the sunken parts into which the ribs of the opposite member have interfitting relationship. The outer surfaces of the ribs are inclined and the front sloping faces of successive ribs in the opposed members are relatively long and in the assembled pulley have a crossing relation with each other to form inward extensions of outwardly flaring circumferential rim portions on the inner sides of the members to form a peripheral V-groove with interrupted side walls which present a sinuous course laterally and circularly of the pulley to receive a strand or cord and grippingly engage the same but not so tightly as to prevent it from being easily released as the cord is carried along in a curved path by the rotation of the pulley or wheel.

In the preferred embodiment chosen for disclosure herein the pulley or wheel structure comprises two duplicate annular members 10 fixed to a hub 12, each member being formed from sheet material, such as a sheet metal stamping of suitable gauge to provide the desired stiffness. If desired, the members 10 may be molded from either metal or non-metallic materials instead of being made from a stamping.

As illustrated in Figs. 3 and 4, each member 10 has an inwardly dished outer side 13 formed at its outer edge with a short laterally projecting circumferential lip 14 of arcuate cross-section. The outer surface of the lip 14 provides the peripheral face 15 of the member 10, and is convexedly curved and merges with the conical surface of the wide sloping rim portion 16 adjacent the outer periphery of the member on the inner side of the member 10 so that when the two members are placed together in assembled relation, the opposed rim portions 16 provide the outwardly flaring entrance of the V-groove to receive a cord or other strand material.

The portion of each member lying around the marginal edges of the central opening 18 is of annular form provided with flat surfaces on its opposite side faces and forms a central web 19. As shown in Fig. 3, the web portions 19 of the two members 10 are in contact with each other in the assembled pulley or wheel.

Disposed between the outer boundary of the annular inner web portion 19 of each member 10 and the inner boundary of the annular rim portion 16 is the radially corrugated imperforate intermediate face portion generally indicated at 20 which in the complete pulley or wheel forms the inner cord-engaging and gripping portions of the side walls of the groove of the wheel or pulley. In the form herein shown, the metal of the intermediate portion 20 has been struck laterally to provide a plurality of radially extending projections or ribs 21 which project axially from the inner side face of the member 10 and extend radially from the inner boundary of the rim portion 16 towards the center of the respective wheel members 10. Alternating with these ribs around the member are a plurality of radially arranged depressions or pockets 22 which project laterally from the outer face of the member 10 into the dished side thereof, the pockets 22 being struck from the metal lying between each pair of adjacent ribs. The arrangement of ribs 21 and pockets 22 is such that a rib and a pocket will lie upon any diametrical line taken in the member.

As illustrated in Fig. 2, each of the ribs 21 is of generally pyramidal form radially of the wheel and has sloping sides 24, 25, 26, and 27 which intersect to provide the apex 28 and with the edges of respective intersecting pairs of sloping surfaces being rounded. The apex 28 is well set back from the outer peripheral edge of the member to provide with respect to the apex the short steep rearwardly sloping surface 24 and the relatively long forwardly sloping surface 25 which terminates at its outer radial extremities on the inner boundary of the marginal rim portion 16 of the member 10, merges into the sloping surface of said rim portion 16 to form a radial extension thereof.

The ribs 21 and the pockets 22 of each member 10 are preferably of a size so that when the two members 10 are placed together in opposed relation in the assembled pulley or wheel, one member being inverted with respect to the other, the central web portions 19 of the two members will be in contact as shown in Fig. 3, and the ribs 21 in one member will project into the depressions or pockets 22 in the other member. When thus assembled, the apex 28 of each of the ribs 21 will be nested in the hollow of the deepest part of its respective pocket 22 with a slight gap formed between the contiguous surfaces, and from this common point outwardly toward the rim portions 16 the juxtaposed sloping surfaces of the rib 21 and the pocket 22 diverge so that the spacing therebetween becomes progressively greater as they approach and intersect the inner limit of the rim portion 16, as indicated at 29. It will thus be seen that by this arrangement the long sloping outer surface 25 of one rib 21 in one member and that of the next adjacent rib 21 in the other member will have a generally crossing relationship to form the working region of a V groove and provide a passage of sinuous formation, as shown in Fig. 6, which extends laterally and circularly of the completed pulley or wheel adapted to receive and provide good gripping or frictional engagement with a cord or strand 30 and form with the opposed convexedly curved rim portions 16 the side walls of the complete V-groove. As illustrated in Fig. 6, the ribs 21 are shown as being hollow and of substantially U-shaped formation circularly of the wheel.

The two members 10 are permanently secured in their assembled relation to the hub by assembling them upon the reduced end portion 31 of the cylindrical hub 12 with the inner faces of the members 10 placed together and with the dished outer faces of the members 10 facing in opposite directions. The reduced end portion 31 of the hub 12 extends through the central openings 18 in the members 10 and has its outer edge upset or spread down over the outer face of the web 19 of the adjacent member to form the clamping bead 32, and accomplished by either a hammering or by a spinning operation.

Means are provided to aid in centering the ribs of one member within the pockets in the other member as well as to prevent rotation of the members 10 with respect to each other on the hub 12, and in its preferred form this means comprises interfitting elements of similar shape carried by the web portion 19 of each member. In the form herein shown, the metal of the web portion 19 opposite the inner end of a rib 21 is struck laterally to provide a recess 35 on the inner side of the member 10 and a projection 36 on the outer or dished side of the member. Similarly, a recess 37 is formed in the web portion 19 on its outer side and a projection 38 on the inner side at a point diametrically across the web from the projection 36 and opposite a pocket 22. The projections 36 and 38 and the recesses 35 and 37 are all of the same size so that when the members 10 are placed together in assembled position, the projections 38 of the members will extend into the oppositely disposed recesses 35, as shown in Figs. 3 and 5, and will act to prevent relative rotational movement of the members 10.

To secure the pulley or wheel to a shaft, this may be done by tightening a set screw 40 threaded into the hub 12. While I have illustrated an Allen set screw for this purpose, it will be apparent that a set screw of either the slotted type or of the headed type may be substituted therefor.

Such a pulley or wheel construction is particularly adapted for use as a feed wheel or a tension wheel in rubber covering machines where good gripping engagement but ready release of the cord or strand acted upon are of great importance.

I claim:

1. A wheel construction comprising a hub having near one end a reduced portion forming a shoulder and having the edge of said reduced portion turned over to form a clamping bead, and a pair of duplicate imperforate discs attached to said hub between said shoulder and said bead; each disc having a central opening through which said reduced portion of the hub extends, an inner annular flat portion surrounding said opening, a series of radially disposed ribs outstanding on one side of the plane defined by said inner annular flat portion, another series of radially disposed ribs outstanding on the other side of said plane, the ribs of each series being intermediate of those of the other series, an outer flat portion beyond the outer ends of said ribs inclined to said plane and terminating in a rounded over edge turned away from said plane; the said discs being attached as aforesaid with their inner annular flat portions in contact, with their outer annular flat portions inclined away from one another, and with the ribs of one disc nesting in spaces between the ribs of the other disc to form a V-groove beyond the outer ends of all said ribs.

2. A wheel construction comprising a hub having near one end a reduced portion forming a shoulder and having the edge of said reduced portion turned over to form a clamping bead, and a pair of duplicate imperforate discs attached to said hub between said shoulder and said bead; each disc having a central opening through which said reduced portion of the hub extends, an inner annular flat portion surrounding said opening, a series of radially disposed ribs outstanding on one side of the plane defined by said inner annular flat portion, another series of radially disposed ribs outstanding on the other side of said plane, the ribs of each series being intermediate of those of the other series, a projection pressed out of said inner flat portion on one side leaving a socket on the opposite side thereof, another projection pressed out of said inner flat portion on said opposite side leaving a socket on the first said side thereof, one said projection being opposite a rib of one of said series and the other projection being opposite a rib of the other of said series, an outer flat portion beyond the outer ends of said ribs inclined to said plane and terminating in a rounded over edge turned away from said plane; the said discs being attached as aforesaid with their inner annular flat portions in contact with a projection on one disc inserted in a socket of the other disc, with their outer annular flat portions inclined away from one another, and with the ribs of one disc nesting in spaces between the ribs of the other disc to form a V-groove beyond the outer ends of all said ribs.

CLARENCE E. BUOTE.